United States Patent
Peleg et al.

(10) Patent No.: US 10,354,400 B2
(45) Date of Patent: Jul. 16, 2019

(54) METHOD AND SYSTEM FOR MATCHING STEREO IMAGES

(71) Applicant: SAMSUNG ELECTRONICS CO., LTD., Suwon-si, Gyeonggi-Do (KR)

(72) Inventors: Tomer Peleg, Givatayim (IL); Omry Sendik, Saba (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 120 days.

(21) Appl. No.: 15/600,127

(22) Filed: May 19, 2017

(65) Prior Publication Data
US 2018/0336432 A1  Nov. 22, 2018

(51) Int. Cl.
G06K 9/00 (2006.01)
G06T 7/593 (2017.01)
G06T 5/40 (2006.01)
H04N 13/133 (2018.01)

(52) U.S. Cl.
CPC .......... *G06T 7/593* (2017.01); *G06K 2209/40* (2013.01); *G06T 5/40* (2013.01); *G06T 2207/10021* (2013.01); *G06T 2207/20021* (2013.01); *H04N 13/133* (2018.05)

(58) Field of Classification Search
None
See application file for complete search history.

(56) References Cited

U.S. PATENT DOCUMENTS

2012/0207383 A1* 8/2012 El Dokor ............... G06T 7/187
                                                        382/154
2018/0324403 A1* 11/2018 Boyd ..................... B64D 47/08

OTHER PUBLICATIONS

M. Sarkis and K. Diepold, "Sparse stereo matching using belief propagation", IEEE International Conference on Image Processing (ICIP), pp. 1780-1783, 2008.

(Continued)

*Primary Examiner* — Randolph I Chu
(74) *Attorney, Agent, or Firm* — F. Chau & Associates, LLC

(57) ABSTRACT

A method of matching stereo images includes: determining, first information indicating which orientations are dominant in each pixel location of a right image and a left image among the stereo images; determining second information indicating for each pixel location in the right image and the left image whether it lies on a pure horizontal edge; detecting points in the left image and the right image based on the first information and the second information; and performing a matching on the left image and the right image using the detected points to estimate a sparse disparity map.

20 Claims, 16 Drawing Sheets

(56) References Cited

OTHER PUBLICATIONS

X. Sun, X. Mei, S. Jiao, M. Zhou, and H. Wang, "Stereo Matching with Reliable Disparity Propagation", 3DIMPVT, pp. 132-139, 2011.

S. Hawe, M. Kleinsteuber, and K. Diepold, "Dense Disparity Maps from Sparse Disparity Measurements", Proceedings of the ICCV, pp. 2126-2133, 2011.

Y. Mu, H. Zhang, and J. Li, "A global sparse stereo matching method under structure tensor constraint", in International Conference on Information Technology and Computer Science, pp, 609-612, 2009.

J. Witt and U. Weltin, "Sparse stereo by edge-based search using dynamic programming", in International Conference on Pattern Recognition (ICPR), IEEE, pp. 3631-3635, 2012.

K. Schauwecker, R. Klette, and A. Zell, "A new feature detector and stereo matching method for accurate high-performance sparse stereo matching", in International Conference on Intelligent Robots and Systems (IROS), IEEE, pp. 5171-5176, 2012.

\* cited by examiner

METHOD AND SYSTEM FOR MATCHING STEREO IMAGES

BACKGROUND

1. Technical Field

The present inventive concept relates to a method and device for generating a disparity map from stereo images and stereo matching method and device thereof.

2. Discussion of Related Art

Stereo matching technology is used to obtain a three-dimensional (3D) image from stereo images. Further, stereo matching technology may be used to obtain a 3D image from multiple two-dimensional (2D) images of an object photographed from different positions on a same line. The stereo images are a pair of 2D images of the object photographed from different positions.

The 3D image can be generated from disparity information of the stereo images. For example, if the stereo images are left and right images photographed by two left and right cameras, one of the left and right images is set as a reference image while the other image is set as a search image. A distance between the reference image and the search image with respect to the same point on a space is referred to as a disparity. A depth map may be generated using the disparity between the reference image and the search image with respect to all pixels thereof.

Most stereo matching algorithms can be roughly classified into three categories: global, local, and sparse-to-dense. Global methods formulate the stereo matching problem as an energy minimization function over the entire image with data and smoothness terms. While these methods have shown very good performance, their computational effort is to demanding for implementation in hardware. Local methods compute each pixel's disparity independently over some limited support. While these methods are more suitable for hardware, they typically lead to inferior performance. Sparse-to-dense methods rely on obtaining a sparse density map, which can serve as an input to various inpainting or propagation techniques that aim at recovering from them a dense disparity map. When obtaining a sparse density map it is important to avoid high error rates at texture-less regions or repetitive structures. The sparsity level of this intermediate map can have a significant effect on the final quality of the dense map.

SUMMARY

According to an exemplary embodiment of the inventive concept, a method of matching stereo images includes: determining, first information indicating which orientations are dominant in each pixel location of a right image and a left image among the stereo images; determining second information indicating for each pixel location in the right image and the left image whether it lies on a pure horizontal edge; detecting points in the left image and the right image based on the first information and the second information; and performing a matching on the left image and the right image using the detected points to estimate a sparse disparity map.

According to an exemplary embodiment of the inventive concept, a mobile device for matching stereo images including a right image and a left image is provided. The mobile device includes a processor configured to determine first information indicating which orientations are dominant in each pixel location of a right image and a left image among the stereo images, second information indicating for each pixel location in the right image and the left image whether it lies on a pure horizontal edge, detect points in the left image and the right image based on the first information and the second information, and perform a matching on the left image and the right image using the detected points to estimate a sparse disparity map.

According to an exemplary embodiment of the inventive concept, a method for matching stereo images includes: determining, by a processor, information indicating which whether at least one of horizontal, vertical, and diagonal orientations are dominant in each pixel location of a right image and a left image among the stereo images; detecting, by the processor, points in the left image and the right image based on the information; and performing, by the processor, a matching on the left image and the right image using the detected points to estimate a sparse disparity map.

BRIEF DESCRIPTION OF THE DRAWINGS

The present inventive concept will become more apparent by describing in detail exemplary embodiments thereof with reference to the attached drawings, in which.

DETAILED DESCRIPTION

Figure 1:
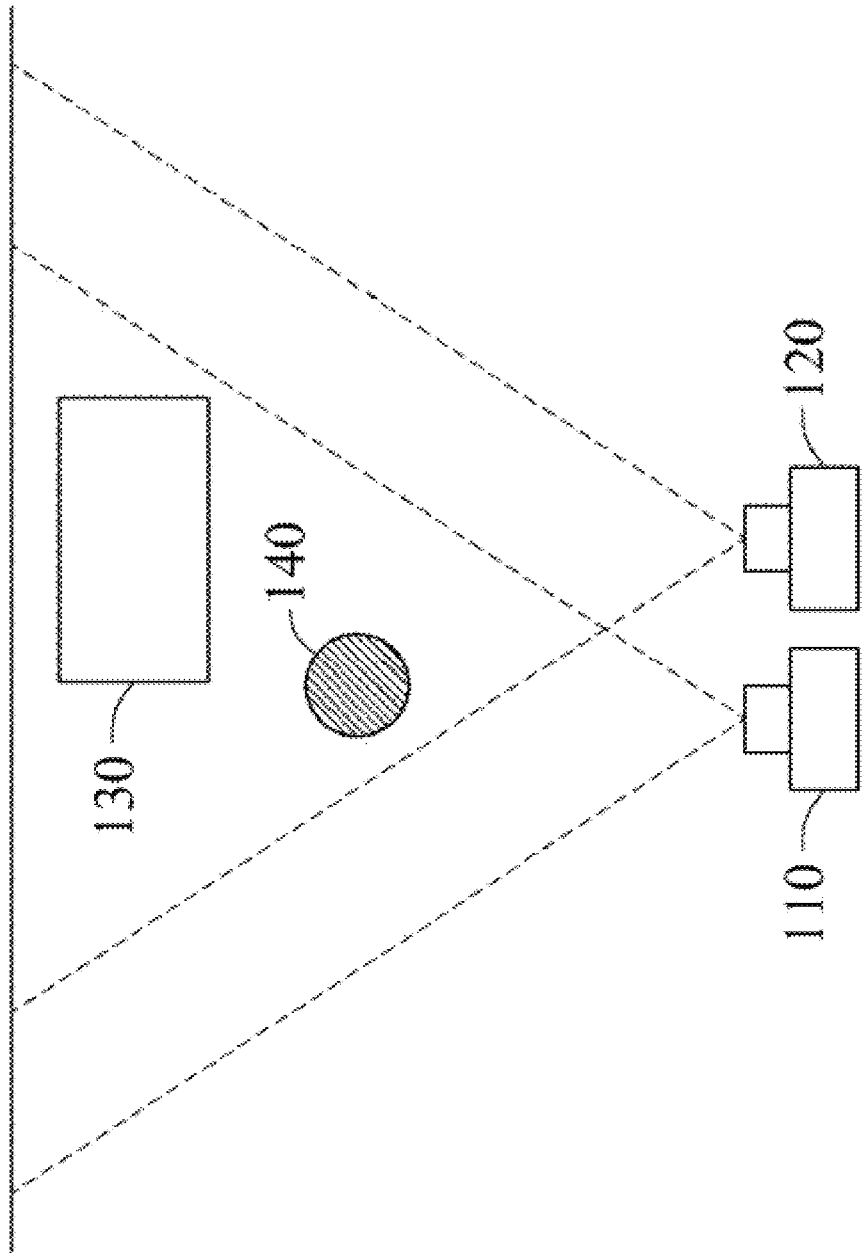
FIG. 1 illustrates a disposition of cameras to be used to photograph stereo images according exemplary embodiments of the inventive concept.

Hereinafter, some exemplary embodiments of the inventive concept will be described in detail with reference to the accompanying drawings. Regarding the reference numerals assigned to the elements in the drawings, it should be noted that the same elements will be designated by the same reference numerals, wherever possible, even though they are shown in different drawings. Embodiments described herein may be variously changed or modified without departing from embodiments of the inventive concept. As used herein, the singular forms "a", "an", and "the", are intended to include the plural forms as well, unless the context clearly indicates otherwise.

At least one embodiment of the inventive concept makes use of a sparse-to-dense stereo matching method that focuses on hardware efficient criterion for detecting pixel locations which are both informative and less prone to suffer from the well-known aperture problem. Further, this embodiment relies on detecting dominant orientations in the vicinity of a pixel location and utilizes the detected orientations for finding the desired pixels locations.

FIG. 1 illustrates a disposition of cameras to be used to photograph stereo images according to example embodiments. Stereo matching or stereo image marching refers to matching of images obtained by photographing an identical scene from at least two different points of view. The stereo image matching may involve determining a correspondence between pixels of the images.

Referring to FIG. 1, a first camera 110 and a second camera 120 photograph an identical scene from different points of view. Referring to FIG. 1, a first camera 110 and a second camera 120 photograph an identical scene from different points of view.

The scene includes a background 130 and a foreground 140. The first camera 110 and the second camera 120 may be disposed in parallel in a horizontal direction. Images photographed by the first camera 110 and the second camera 120 are illustrated in FIG. 2.

Figure 2:
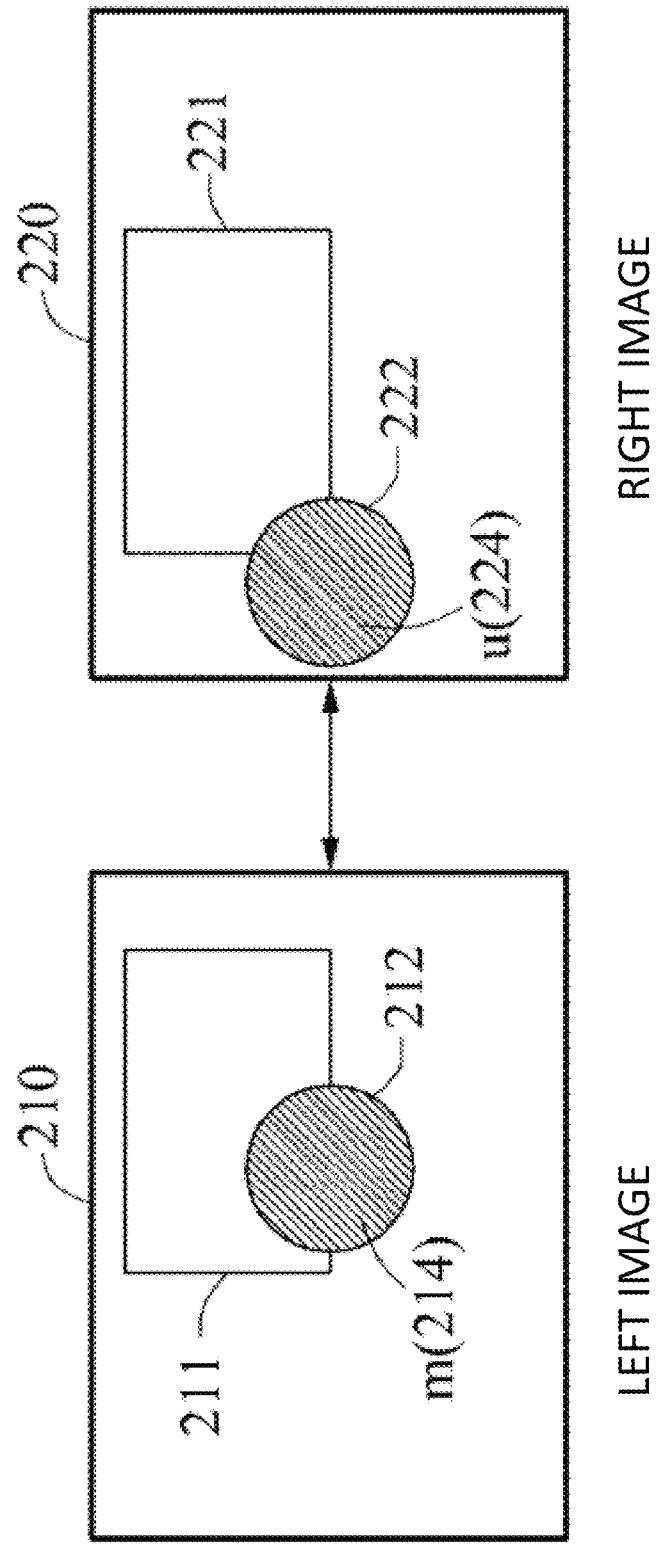
FIG. 2 illustrate generated stereo images according to exemplary embodiments of the inventive concept.

FIG. 2 illustrates generated stereo images according to example embodiments. Referring to FIG. 2, a left image 210 is an image photographed by the first camera 110 of FIG. 1. A right image 220 is an image photographed by the second camera 120 of FIG. 1. Since the first camera 110 and the second camera 120 have different points of view, the left image 210 and the right image 220 include the background 130 and the foreground 140 at different positions. Since the left image 210 and the right image 220 are obtained by photographing the identical scene, the left image 210 and the right image 220 may include identical components. In an exemplary embodiment, the two cameras 110 and 120 are both located within a same mobile device (e.g., a smartphone, a tablet computer, a smartwatch, etc.).

The foreground 140 corresponds to a first foreground 212 and a second foreground 222. Since the first foreground 212 and the second foreground 222 are values obtained by photographing the identical foreground 140, pixels of the first ground 212 may correspond to pixels of the second foreground 222. For example, a pixel m 214 of the first foreground 212 may correspond to a pixel u 224 of the second foreground 222. The background 130 corresponds to a first background 211 and a second background 221. Since the first background 211 and the second background 221 are values obtained by photographing the identical background 130, pixels of the first background 211 may correspond to pixels of the second background 221.

Figure 3:
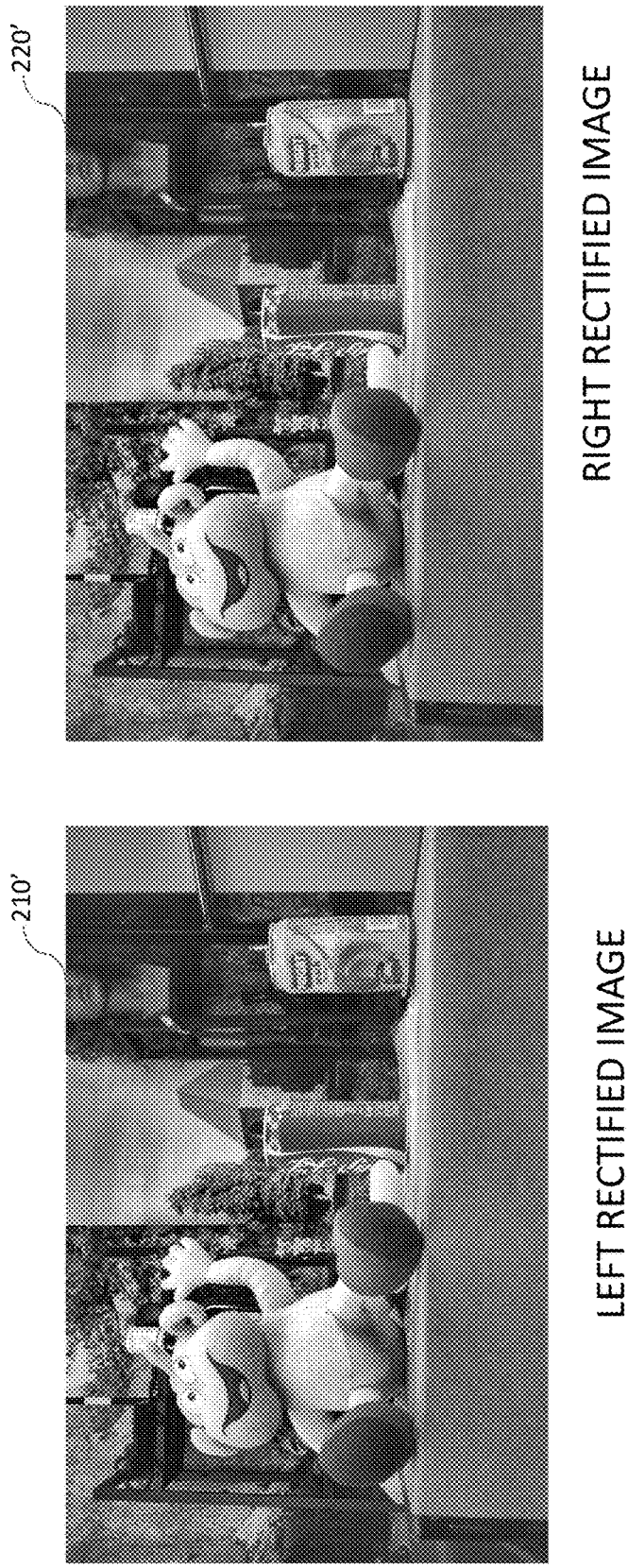
FIG. 3 illustrates a pair of rectified stereo images.

FIG. 3 depicts a pair of rectified images 210' and 220', which may be generated from the left image 210 and the right image 220 of FIG. 2, respectively.

When stereo matching is performed between the left image 210 and the right image 220, a displacement or a disparity between the pixel m 214 of the first foreground 212 and the pixel u 224 of the second foreground 222 may be calculated. When the displacement or the disparity is calculated, actual distances from the first camera 110 and the second camera 120 to the foreground 140 may be calculated. The disparity occurs in a horizontal direction. In the process of performing stereo matching between the left image 210 and the right image 220, a binocular disparity map of the left image 210 and a binocular disparity map of the right image 220 may be estimated. Hereinafter, a binocular disparity map is referred to as a disparity map.

While typical stereo matching is performed with respect to all pixels of the first foreground 212 and all pixels of the second foreground 222, an exemplary embodiment of the inventive concept filters out some of the pixels prior to the matching so the matching can be performed more efficiently in hardware.

It is assumed throughout the disclosure that embodiments of the inventive concept are applied to already rectified stereo images. This means that for every pixel location in the right image (apart from occluded pixel locations, namely those pixels that appear in the right image, but not on the left image), the corresponding location in the left image can be found on a horizontal search line at the same y location around the original x location. The reference pixel location in the right image and the set of pixel locations mentioned above in the left image are regarded as satisfying the epipolar geometry constraint.

A set of orientations and a set of symmetry axes, each passing through the center pixel location and perpendicular to one of the orientations is defined for a small image patch of each of the rectified images 210' and 220'. Each point on the symmetry axis serves as an origin pixel from which left and right arms emanate at the given orientation. Image patches of size 11×11 and a set of 4 orientations: horizontal (H), vertical (V), forward-slash (S), and back-slash (BS) are depicted in FIGS. 4-7. However, the inventive concept is not limited to patches of any particular size. For example, embodiments of the inventive concept may operate on image patches smaller or greater than 11×11. FIGS. 4-7 visualize the symmetry axes and the directions of the arms drawn at their maximal length choices. The left arms are drawn using a solid line and the right arms are drawn using a dashed line.

Figure 4:
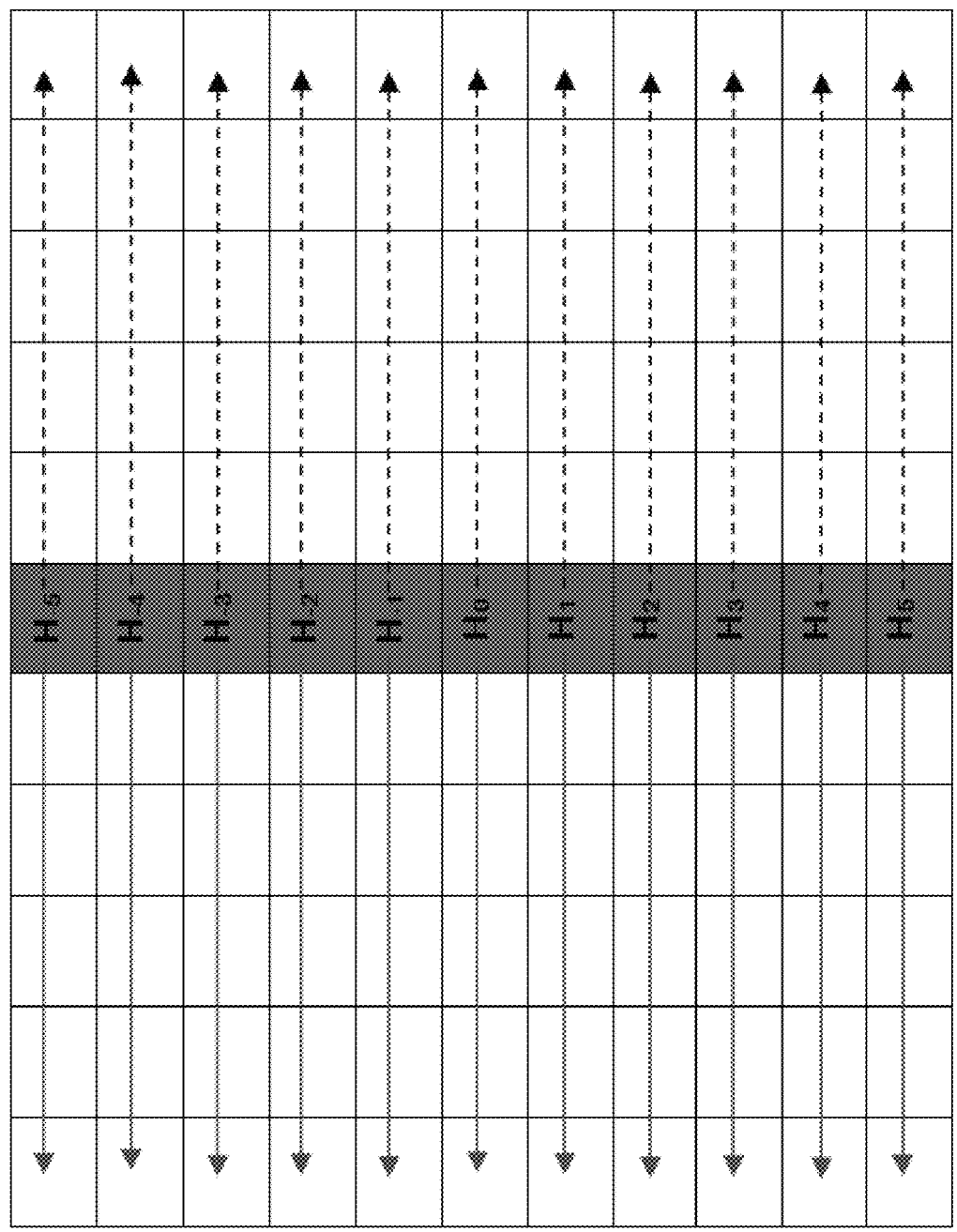
FIG. 4 illustrates pixels of an image patch arranged into maximal horizontal arms (e.g., a horizontal orientation) for use in embodiments of the inventive concept.

Referring to FIG. 4, the left arms correspond to horizontal rows of pixels extending to the left having one of origin pixels $H_0$, $H_{-1}$, $H_{-2}$, $H_{-3}$, $H_{-4}$, $H_{-5}$, $H_1$, $H_2$, $H_3$, $H_4$, and $H_5$ and the right arms corresponds to horizontal rows of pixels extending to the right having one of the same origin pixels.

Figure 5:
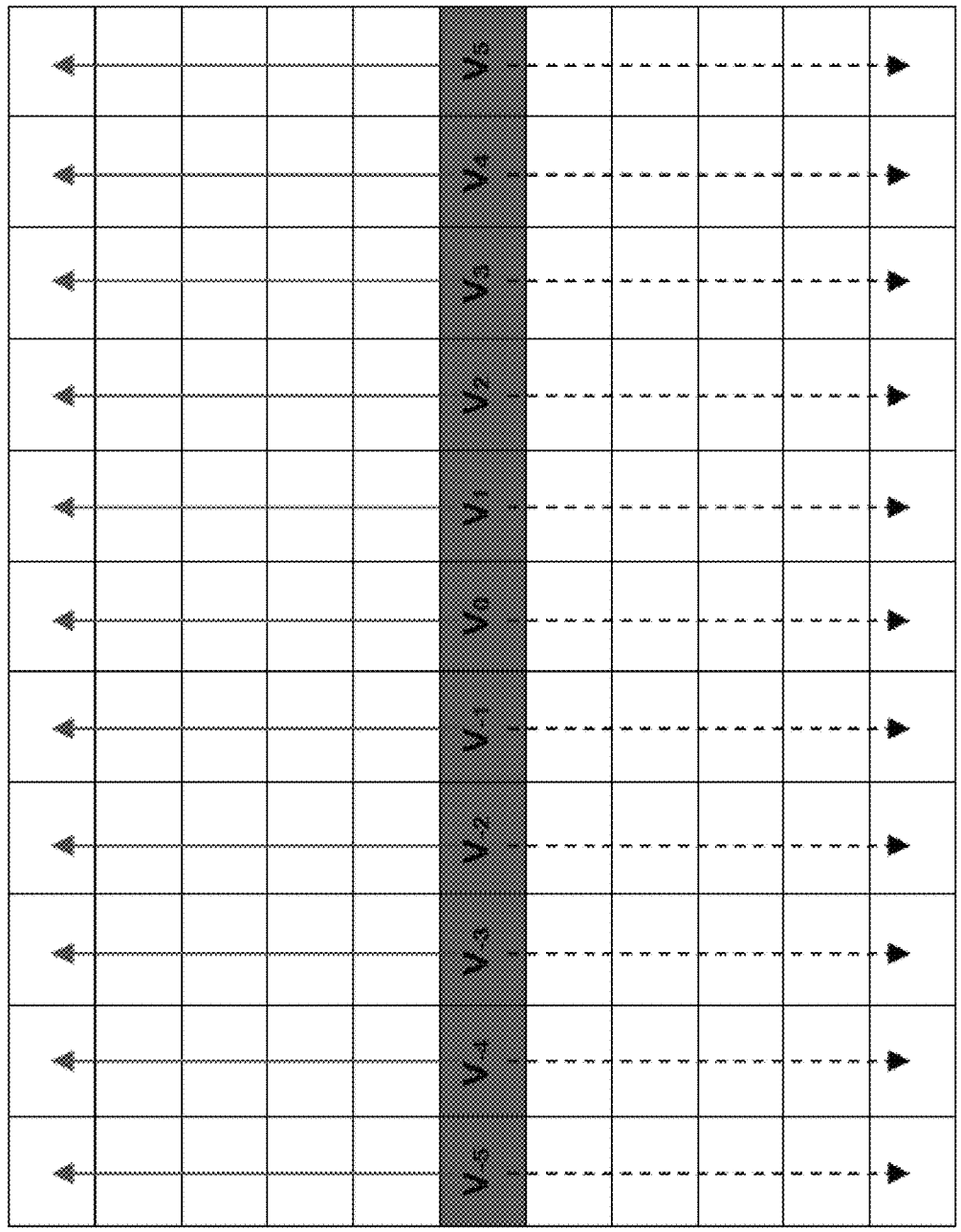
FIG. 5 illustrates pixels of an image patch arranged into maximal vertical arms (e.g., a vertical orientation) for use in embodiments of the inventive concept.

Referring to FIG. 5, the left arms correspond to vertical rows of pixels extending upward having one of origin pixels $V_0$, $V_{-1}$, $V_{-2}$, $V_{-3}$, $V_{-4}$, $V_{-5}$, $V_1$, $V_2$, $V_3$, $V_4$, and $V_5$ and the right arms corresponds to vertical rows of pixels extending downward having one of the same origin pixels.

Figure 6:
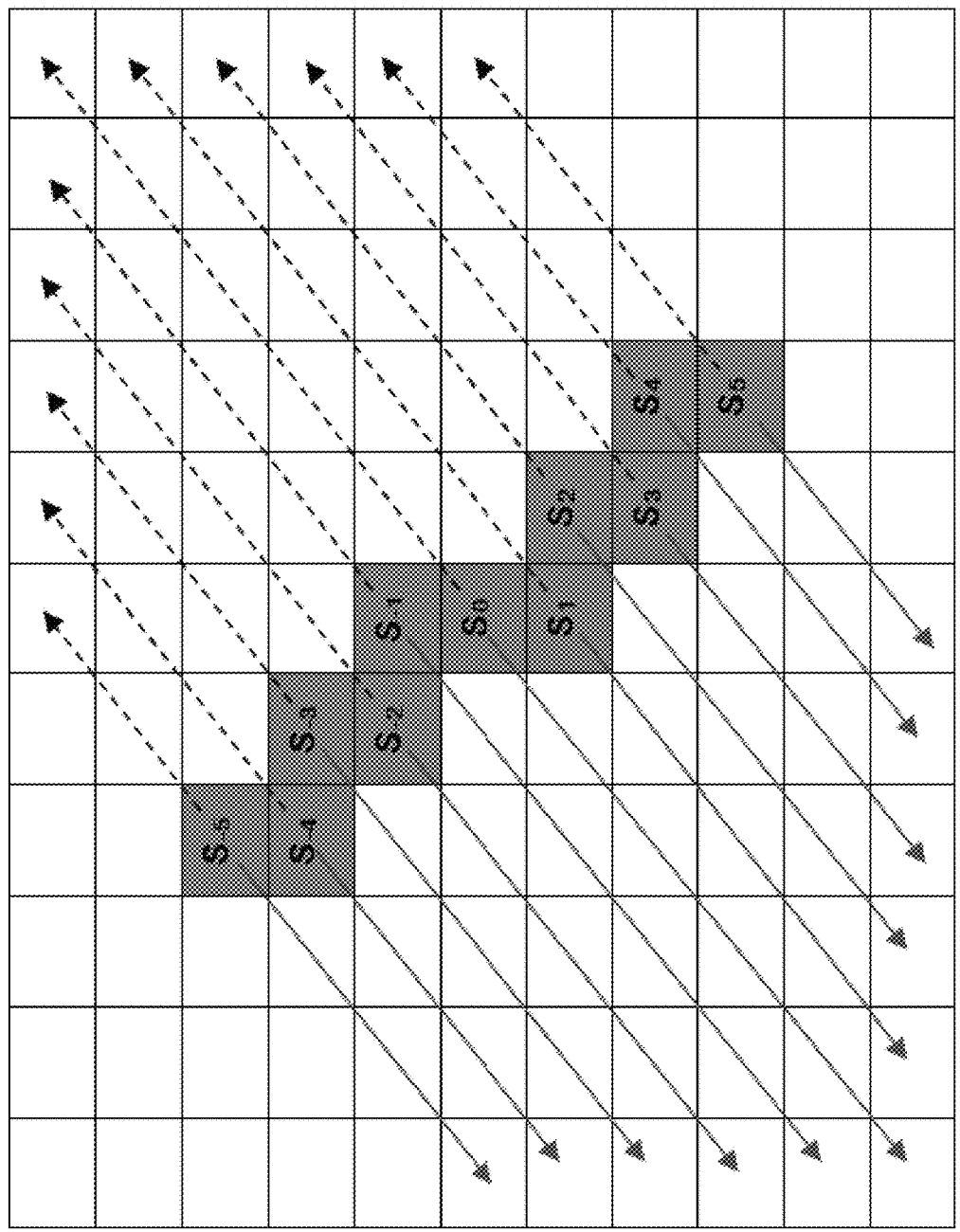
FIG. 6 illustrates pixels of an image patch arranged into maximal forward slash arms (e.g., a slash orientation) for use in embodiments of the inventive concept.

Referring to FIG. 6, the left arms corresponds to forward-slashes (S) (e.g., diagonals) of pixels extending down to the left including one of origin pixels $S_0$, $S_{-1}$, $S_{-2}$, $S_{-3}$, $S_{-4}$, $S_{-5}$, $S_1$, $S_2$, $S_3$, $S_4$, and $S_5$, and the right arms corresponds to forward slashes (diagonals) extending up to the right and including one of the same origin pixels.

Figure 7:
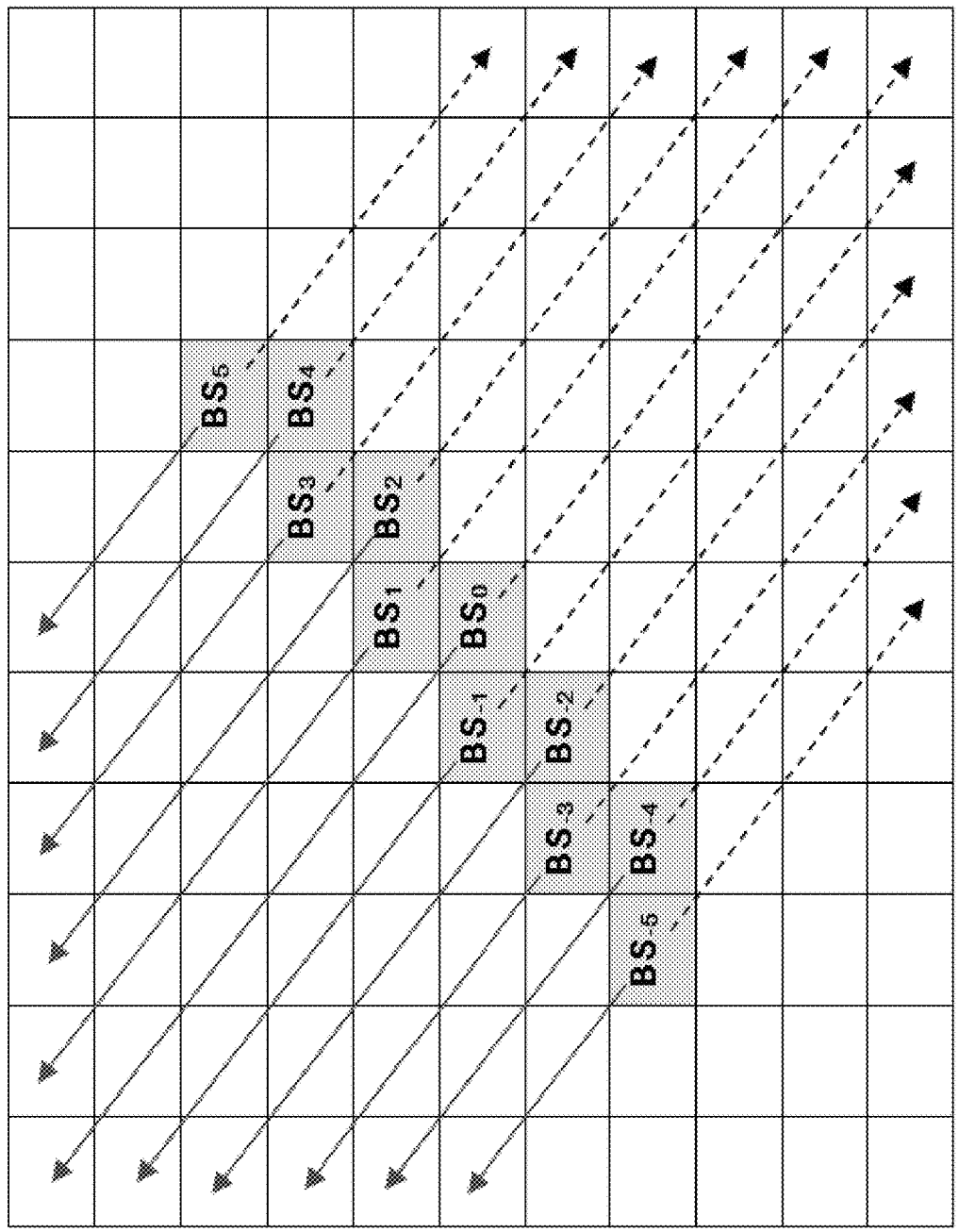
FIG. 7 illustrates pixels of an image patch arranged into maximal back-slash arms (e.g., a back-slash orientation) for use in embodiments of the inventive concept.

Referring to FIG. 7, the left arms corresponds to back-slashes (e.g., diagonals) pixels extending up to the left and including one of origin pixels $BS_0$, $BS_{-1}$, $BS_{-2}$, $BS_{-3}$, $BS_{-4}$, $BS_{-5}$, $BS_1$, $BS_2$, $BS_3$, $BS_4$, and $BS_5$, and the right arms corresponds to back-slashes (diagonals) of pixels extending down to the right and including one of the same original pixels.

The forward-slashes may be arranged in a 45 degree angle where the back-slashes are orthogonal to the forward slashes.

An exemplary embodiment of the invention filters out some of the pixels of image patches of each of the reference image (e.g., a right image) and the search image (e.g., a left image) based on the dominant orientations within the image patches so that stereo matching can be performed in a more efficient manner. An image patch has a dominant orientation, when it includes many edge locations of a particular orientation. A given image patch may have a single dominant orientation or multiple dominant orientations. For example, an image patch could include only a dominant V orientation, only a dominant H orientation, only a dominant S orientation, only a dominant BS orientation, or have combinations thereof such as dominant S and V orientations, dominant H and V orientations, etc.

Figure 8:
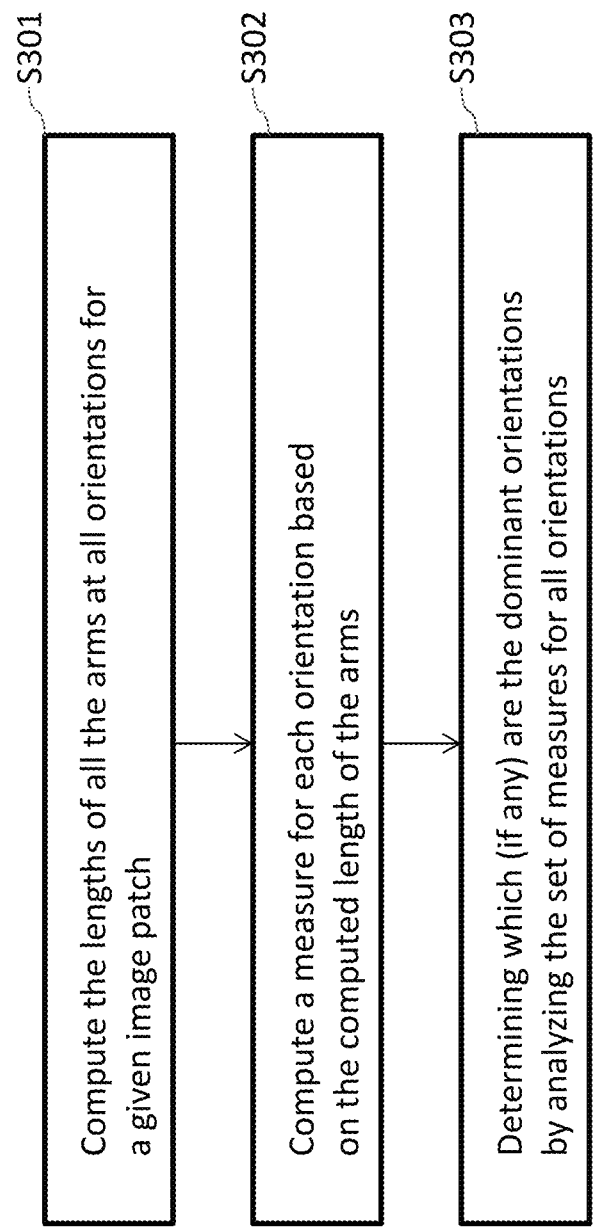
FIG. 8 illustrates a method of determining a dominant orientation within each of stereo images, according to an exemplary embodiment of the inventive concept.

FIG. 8 illustrates a method for detecting the dominant orientations of a given image patch, according to an exemplary embodiment of the inventive concept.

Referring to FIG. 8, the method includes computing the lengths of all the arms at all orientations for a given image patch (S301). For example, the image patch may be a part of a rectified stereo image. In an exemplary embodiment, the orientations include the H, V, S, and BS orientations. The method further includes computing a measure for each orientation based on the computed length of the arms in the orientation (S302). The method then includes determining which (if any) are the dominant orientations within the image patch by analyzing the set of measures for all orientations (S303). In an embodiment, this process is performed on all image patches of a pair of rectified stereo images, and the resulting sets of dominant orientations are used during a stereo matching that is performed on the pair.

Figure 9:
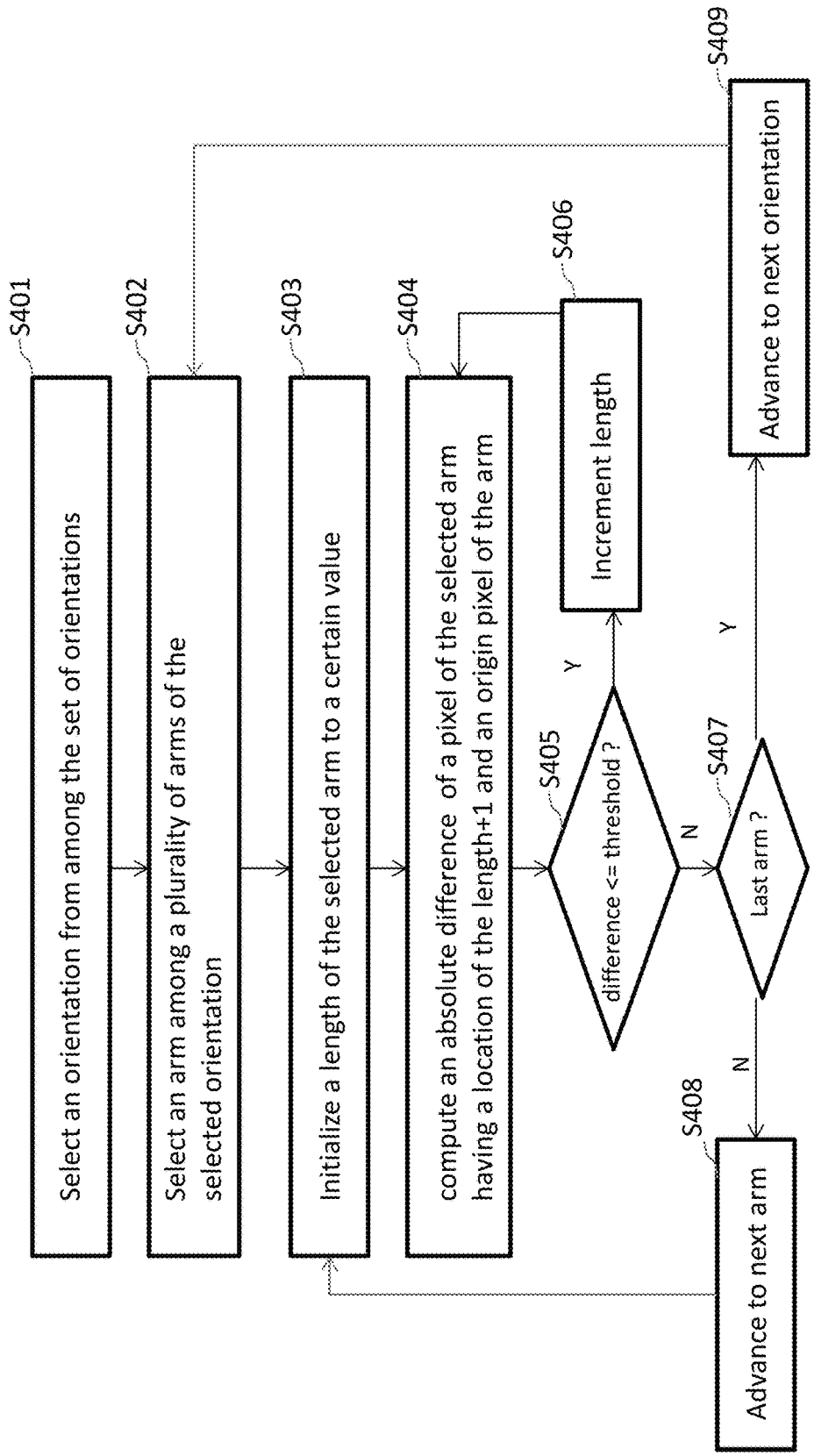
FIG. 9 illustrates a method of adjusting lengths of the arms of the orientations for use in the method of FIG. 8, according to an exemplary embodiment of the inventive concept.

According to an exemplary embodiment, the computing of the lengths is performed by the method illustrated in FIG. 9. For example, FIGS. 4-7 shows the maximal possible lengths of the arms, which may or may not result based on the computing of the lengths. Referring to FIG. 9, the method includes selecting an orientation among the set of orientations (S401). For example, the orientations include H, V, S, and BS.

The method next includes selecting an arm among a plurality of arms of the selected orientation (S402). For example, if the H orientation was selected, the selecting of the arm could include selecting a first left arm including origin pixel $H_5$.

The method next includes initializing a length of the selected arm to a certain value (S403). In an exemplary embodiment, if the arm is selected from orientation H or V, the certain value is 0, and if the arm is selected from orientation S or BS, the certain value is 0 or 1. In an embodiment, an arm has an odd index when it includes an origin pixel having an odd index, and an arm has an even index when it includes an origin pixel having an even index.

In an embodiment, if the arm is selected from orientation S and has even indexes −4 (e.g., includes pixel $S_{-4}$), −2 (e.g., includes pixel $S_{-2}$), 0 (e.g., includes pixel $S_0$), 2 (e.g., includes pixel $S_2$), or 4 (e.g., includes pixel $S_4$), then the certain value is 0.

In an embodiment, if the arm is selected from orientation BS and has even indexes −4 (e.g., includes pixel $BS_{-4}$), −2 (e.g., includes pixel $BS_{-2}$), 0 (e.g., includes pixel $BS_0$)), 2 (e.g., includes pixel $BS_2$), or 4 (e.g., includes pixel $BS_4$), then the certain value is 0.

In an embodiment, if the arm is selected from orientation S and has odd indexes −5 (e.g., includes pixel $S_{-5}$), −3 (e.g., includes pixel $S_{-3}$), −1 (e.g., includes pixel $S_{-1}$), then the certain value is 0 if the arm is a left arm and 1 if the arm is a right arm.

In an embodiment, if the arm is selected from orientation S and has odd indexes 1 (e.g., includes pixel $S_1$), 3 (e.g., includes pixel $S_3$), 1 (e.g., includes pixel $S_1$), then the certain value is 1 if the arm is a left arm and 0 if the arm is a right arm.

In an embodiment, if the arm is selected from orientation BS and has odd indexes −5 (e.g., includes pixel $BS_{-5}$), −3 (e.g., includes pixel $BS_{-3}$), −1 (e.g., includes pixel $BS_{-1}$), 1 (e.g., includes pixel $BS_1$), 3 (e.g., includes pixel $BS_3$), and 5 (e.g., includes pixel $BS_5$), then the certain value is 1 if the arm is a left arm and 0 if the arm is a right arm.

The method then includes computing an absolute difference of a pixel of the selected arm having a location of the current length plus 1 and an origin pixel of the arm (S404). If the current length is 0, and the arm corresponds to the central left arm in the H orientation of FIG. 4, and the intensity of the pixel to the left of origin arm pixel $H_0$ is 100 and the intensity of the origin arm pixel $H_0$ is 80, then the difference would be 20.

The method then includes determining whether the difference is less than or equal to a threshold (S405). If the difference is less than or equal to the threshold, the length of the arm is incremented (S406). For example, the length could be incremented by 1. For example, if the threshold is 25, and the length is currently 0, it would be incremented to 1. Then, in this case the method resumes to step S404 to recalculate the difference based on the new length. For example, if the second pixel corresponding to length 1 plus 1, i.e. 2, along the central left arm in the H orientation has an intensity of 110, the new difference would be 30. Since the new difference is higher than the threshold of 25, no more incrementing is performed for this arm, and the arm stops at a length of 1.

Then the method determines whether it has gone through all of the arms of the selected orientation (S407). In this case, since only the left central arm has been calculated, the method determines that it is not at the last arm, and advances to the next arm (S408). For example, the method could advance to the right central arm, the left arm below the central arm, etc., and then resume to step S403. When the arm lengths have been computed for all the arms of the selected orientation, the method advances to the next orientation (S409). For example, if the H orientation has been completed, then the method could proceed to the V orientation and then resume to step S402 to compute the arm lengths of the arms of the V orientation. The method may continue until the arm lengths have been computed for all arms of all orientations. Please note that in alternate embodiments, the method could be applied only for a subset of the orientations (e.g., only H and V, only S and BS, etc.), or only for a subset of the arms (e.g., only left arms, only right arms, part of the left and right arms, etc.).

The threshold may depend on the amount of light. For example, a camera may have captured an image including the image patch under low light conditions, high light conditions (e.g., excessively bright), or normal light conditions. The threshold may be set based on these light conditions. In an embodiment, the threshold is a first value under low light conditions, a second value under normal light conditions, and a third value under the high light conditions, where the first value > second value > third value.

Figure 10:
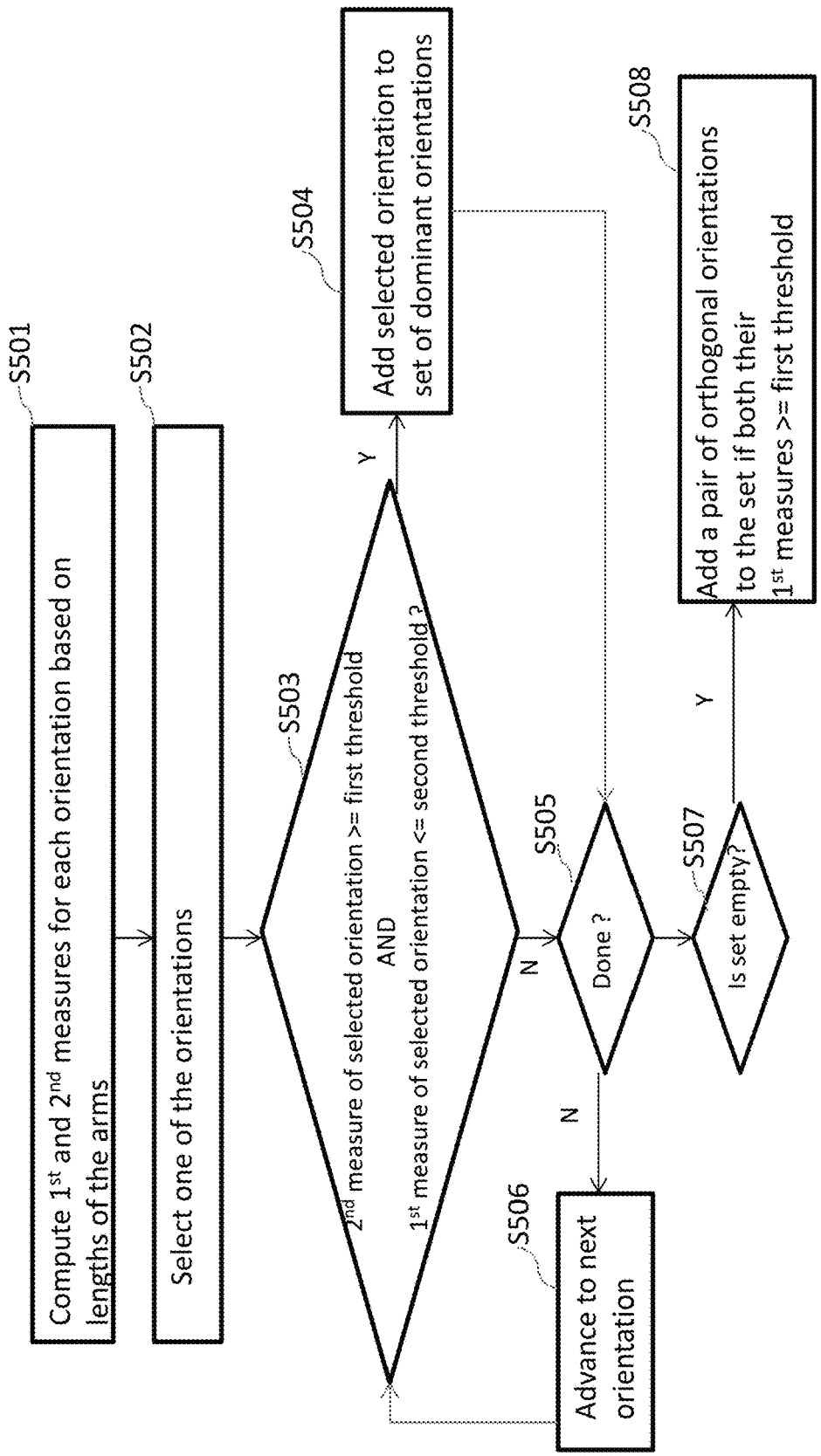
FIG. 10 illustrates a method of computing measures and determining the dominant orientations for use in the method of FIG. 8, according to an exemplary embodiment of the inventive concept.

In an exemplary embodiment, the step S302 of FIG. 8 of computing the measures is performed by the method of FIG. 10. The method includes computing $1^{st}$ and $2^{nd}$ measures for each orientation (H, V, S, and BS) based on lengths of the arms (S501).

The $1^{st}$ measure is hereinafter referred to as ArmsSumLong and the $2^{nd}$ measure is hereinafter referred to as ArmsSumShort.

In an embodiment, the ArmsSumLong is calculated by summing the number of arms of the selected orientation with length that are at most 2. For example, if among the 22 arms depicted in FIG. 4 (e.g., 11 left arms and 11 right arms), the method of FIG. 9 had resulted in 8 arms of length 2, 6 arms of length 1, 5 arms of length 0, and 3 arms of maximal length (e.g., 5 in this example since the image patch is 11×11), then the ArmsSumLong would be 19.

In an embodiment, the ArmsSumShort is calculated by summing the number of arms of the selected orientation with length that are at most 1. For example, based on the above, the ArmsSumShort would be 11.

In an embodiment, a third measure (e.g., ArmSumMax) is additionally calculated only for the H orientation, and by summing the number of arms of the H orientation that have the maximal length. For example, based on the above, the ArmsSumMax would be 3.

The method then includes selecting one of the orientations (S502).

The method then includes determining whether the second measure of the selected orientation is >= a first threshold and the first measure of the orientation orthogonal to the selected orientation is <= a second threshold (S503). For example, orientation H is orthogonal to orientation V, and orientation S is orthogonal to orientation BS.

The method adds the selected orientation to a set of dominant orientations if the second measure of the selected orientation is >= the first threshold and the second measure of the orthogonal orientation is <= the second threshold (S504).

The method then determines whether there are any more orientations to check (S505). If there is an additional orientation to check, the method advances to the next orientation (S506), and resumes to step S503.

If all the orientations have been checked, the method determines whether the set of domination orientations is empty (S507).

If the set is empty, a pair of orthogonal orientations are added to the set only if both their $1^{st}$ measures (ArmsSumLong) is >= the first threshold (S508). For example, if the set is empty after performing step S503 on all orientations, and the ArmsSumLong of orientations H and V are both >= the first threshold, then H and V would both be added to the set.

Figure 11:
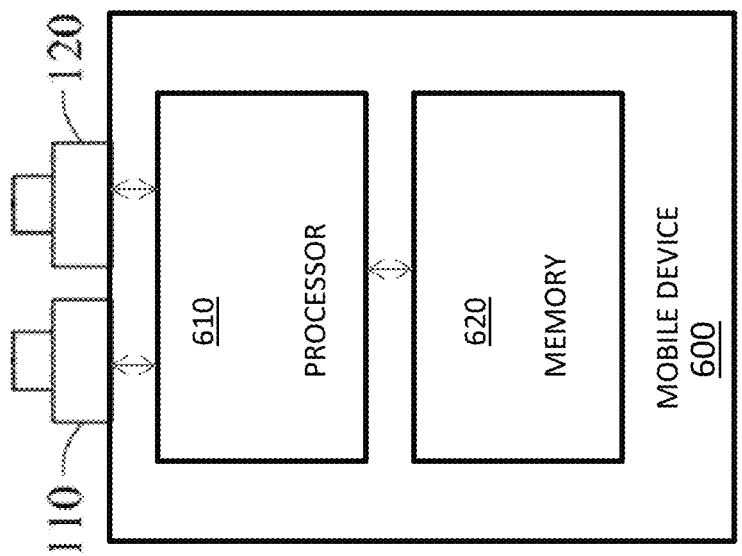
FIG. 11 illustrates a mobile device that may execute the methods of FIGS. 8-10, according to an exemplary embodiment of the inventive concept.

The above method(s) can be applied by the processor 610 of FIG. 11, which is located within a mobile device 600. In an embodiment, the processor 610 is an image signal processor or an application-specific integrated circuit. The processor 610 can apply the method(s) to all image patches of a pair of rectified images (e.g., see 210' and 220' of FIG. 3) to generate a set of dominant orientations for each image patch of each rectified image. The processor 610 may store the set of dominant orientations in memory 620. For example, the memory 620 may include a table for each image of a pair of rectified images in which a stereo matching is about to be performed. The table may include multiple entries, where each entry indicates a particular stereo image, a location (e.g., an index) of an image patch within the stereo image, and the set of dominant orientations for the image patch. The table or another part of the memory 620 may also store the size (e.g., width and height) of the image patch. The memory 620 may be a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or another suitable memory unit.

It is assumed that the cameras 120 and 130 of the mobile device 110 and 120 previously captured left and right images 210 and 220, and then the processor 620 or a digital signal processor of the mobile device 600 generated the rectified left image 210' and the rectified right image 220' from the left and right images 210 and 220. While the mobile device 600 is depicted in FIG. 11 with two cameras, the inventive concept is not limited thereto. For example, in an alternate embodiment, the mobile device 600 only includes a single camera that captures the left image 210 at a first time and the second image 220 at a second later time.

The sets of dominant orientations can be used to filter out some pixel locations so that stereo matching is only performed with respect to the remaining pixel locations. In an exemplary embodiment of the inventive concept, the stereo matching is only performed between pairs of pixel locations that: 1) satisfy an epipolar geometry constraint, 2) share at least one joint dominant orientation (e.g., "informative"), and 3) are not located on a pure horizontal edge (less prone to suffer from the aperture problem due to this condition). Since the images 210' and 220' are rectified, the search range to satisfy the epipolar geometry constraint reduces to a horizontal line at the same y location around the original x location.

A pixel location is located on a pure horizontal edge when it is located within an image patch having only a dominant V orientation and the ArmSumMax for the H orientation is >= a third threshold. Thus, a pixel location is not located on a pure horizontal edge when it is located in an image patch having only a dominant S orientation, only a dominant BS orientation, only dominant S and BS orientations, only dominant S and V orientations, only dominant BS and V orientations, only dominant S, BS, and V orientations, or having a ArmSumMax for the H orientation that is < the third threshold. For example, if a first pixel location of a first pixel in the left rectified image 210' is located within a first image patch having only a dominant S orientation and a second pixel location of a second pixel in the right rectified image 220' satisfying the epipolar geometry constraint is located within a second image patch having only dominant S and BS orientations, the first and second pixel locations share at least one joint dominant orientation, and are not located on a pure horizontal edge. Thus, the first and second pixel locations will be part of the stereo matching. However, if the first image patch instead had only dominant H and V orientations, since the first and second pixel locations would not share at least one dominant orientation, matching will be applied between the first and second pixel locations.

Figure 12:
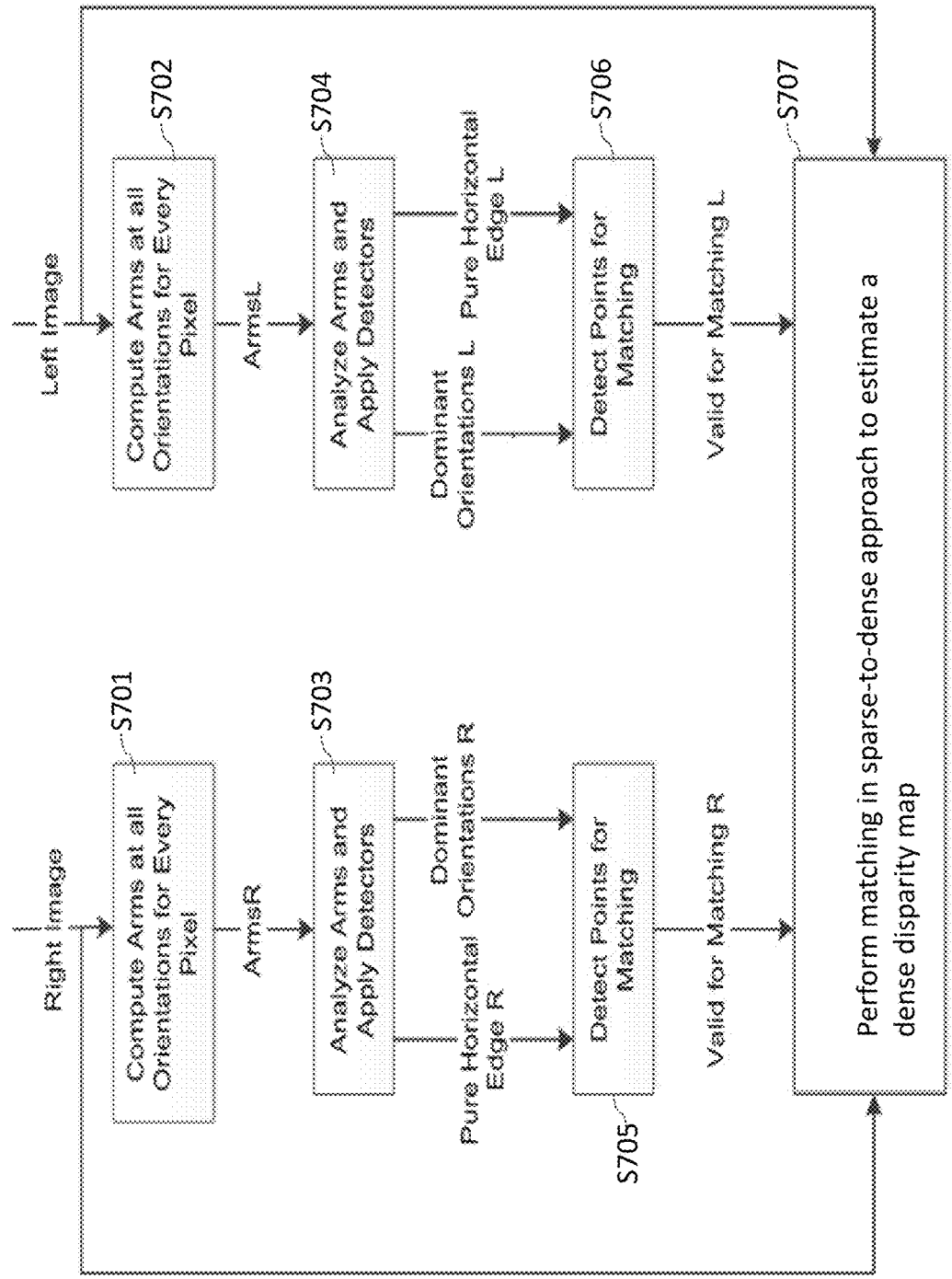
FIG. 12 illustrates a method of estimating a dense disparity map according to an exemplary embodiment of the inventive concept.

A proposed flow according to an exemplary embodiment of the inventive concept for detecting points for matching in a pair of stereo images is depicted in FIG. 12. For each pixel location in each of the stereo images, arms at all the selected orientations are computed over a local patch around the pixel. These arms are then analyzed and utilized for detecting the dominant orientations within the vicinity of each pixel and identifying pixel locations that lie on pure horizontal edges. Using a combination of these two types of detectors, a sparse set of valid pixel locations can be defined on each of the stereo images. Finally, the indicators for these locations, as well as the detected dominant orientations for each of the locations, can serve as useful auxiliary inputs to any matching component in a sparse-to-dense disparity estimation method.

Referring to FIG. 12, the flow includes computing the arms at all orientations for every pixel of the right image (ArmsR) (S701) and computing the arms at all orientations for every pixel of the left image (ArmsL) (S702). The flow then includes analyzing the right image arms ArmR and applying detectors to obtain the right image pure horizontal edges and the right image dominant orientations (S703), and analyzing the left image arms ArmL and applying detectors to obtain the left image pure horizontal edges and the left image dominant orientations (S704). The flow next includes detecting valid right image points from the right image for matching, based on the detected pure horizontal right image edges and dominant right image orientations (S705), and detecting valid left image points from the left image for matching, based on the detected pure horizontal left image edges and dominant left image orientations (S706). Finally, the flow includes performing the matching with the detected valid right image points and the detected valid left image points to estimate a sparse disparity map (S707). This sparse disparity map then serves as an input of "reliable seeds" or "samples" to various inpainting or propagation techniques that aim at recovering from them a dense disparity map.

Dense stereo matching may consume a large amount of power and require hardware that takes up a large area. Utilizing the above-described sparse-to-dense approach offers potential for reduction both in area and in power. At least one embodiment of the inventive concept can detect dominant orientations within a small patch, which enables a hardware implementation to be feasible.

The presence of at least one dominant orientation in the vicinity of a pixel can serve as a criterion for detecting "informative" pixel locations. In turn, the disparity is evaluated only on those "informative" pixel locations. Furthermore, since matching is performed only between pairs of locations that share at least one joint orientation, the number of candidate matches may be significantly smaller than the one implied by the epipolar geometry. Thus, embodiments of the inventive concept may save power.

At least one embodiment of the inventive concept includes a built-in mechanism for ignoring pixel locations which are prone to a high rate of errors (these locations are either "non-informative" or suffer from a high level of ambiguity due to the aperture problem). Moreover, adding constraints to the set of candidates can reduce some ambiguity from the matching and thus contribute to error reduction. Thus, embodiments of the inventive concept may reduce errors.

In an exemplary embodiment, one or more steps of the detectors illustrated in FIG. 12 for the dominant orientations and pure horizontal edges consist of various parameters that allow simple and straight forward control on the sparsity level of the resulting disparity map. For example, the above described thresholds may be adjusted as necessary to provide various different sparsity levels. This provides a tunable sparsity level that allows embodiments of the inventive concept to effectively cope with various light and signal to noise (SNR) conditions.

Figure 13A:
FIG. 13*a* illustrates horizontal edges detected by embodiments of the inventive concept.
Figure 13B:
FIG. 13*b* illustrates vertical edges detected by embodiments of the inventive concept.
Figure 14A:
FIG. 14*a* illustrates forward-slash edges detected by embodiments of the inventive.
Figure 14B:
FIG. 14b illustrates back-slash edges detected by embodiments of the inventive concept.
Figure 15:
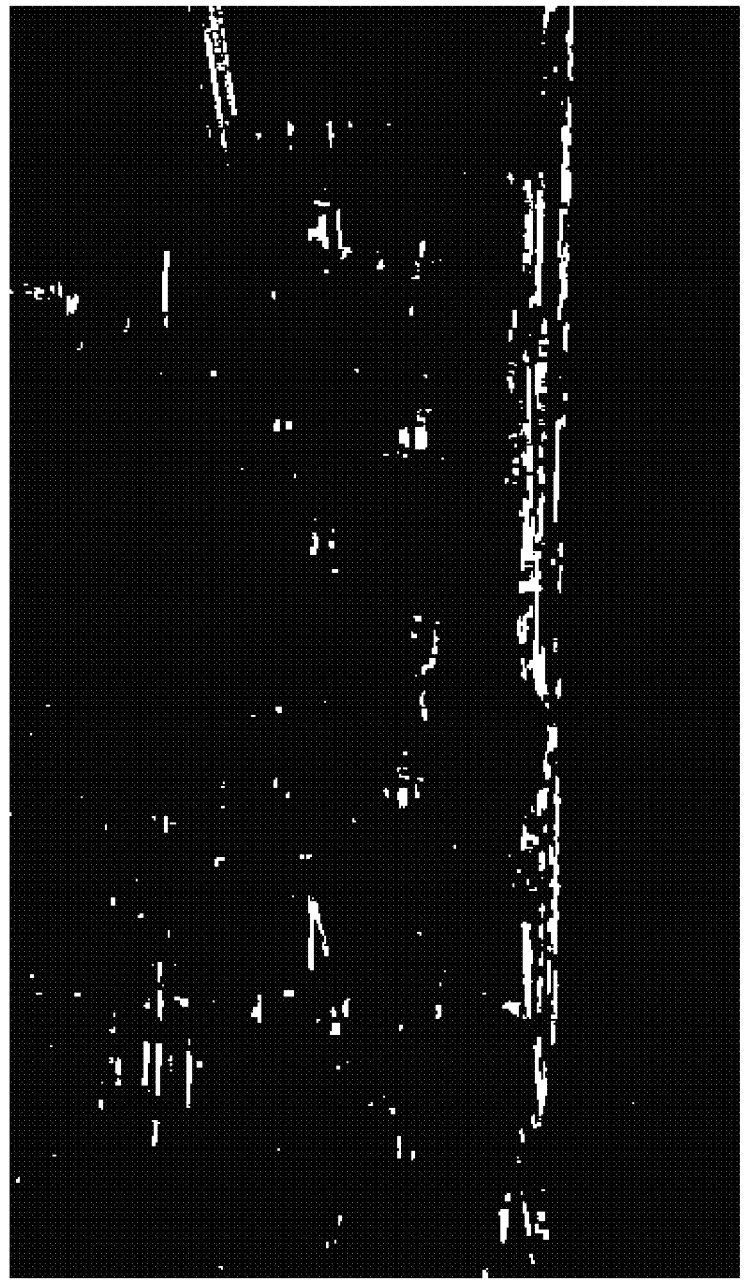
FIG. 15 illustrates pure horizontal edges detected by embodiments of the inventive concept.
Figure 16A:
FIG. 16a illustrates points detected from a right rectified stereo image using embodiments of the inventive concept that may be used in a later stereo matching.
Figure 16B:
FIG. 16b points detected from a left rectified stereo image using embodiments of the inventive concept that may be used in the stereo matching

FIG. 13a, FIG. 13b, FIG. 14a, and FIG. 14b demonstrate a flow according to an embodiment of the invention for detecting points for matching on the right image of FIG. 3. These figures display the detected dominant orientations for each pixel location. A detector according to an embodiment of the inventive concept succeeds in identifying the correct orientation for pixel locations near an edge with a distinct orientation. For textures and more complex patterns, it detects all 4 orientations. FIG. 13a and FIG. 13b show detected orientations for the right image 220' from FIG. 3. Each of the binary images depict the pixel locations, where the corresponding orientation has been detected and added to the dominant set. FIG. 13a illustrates the result of detector for the horizontal (H) orientation and FIG. 13b illustrates the result of detector for the vertical (V) orientation. FIG. 14a illustrates the result of detector for the slash (S) orientation and FIG. 13b illustrates the result of detector for the backslash (BS) orientation. FIG. 15 depicts pixel locations where a pure horizontal edge has been detected. By combining these two types of detectors, a sparse set of points for matching can be identified on each of the stereo images. These two sparse sets are shown in FIG. 16a and FIG. 16b. FIG. 16A shows detected points of the right image. FIG. 16B shows detected points of the left image.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

Although the present inventive concept has been described in connection with exemplary embodiments thereof, those skilled in the art will appreciate that various modifications can be made to these embodiments without substantially departing from the principles of the present inventive concept.

What is claimed is:

1. A method of matching stereo images to obtain a three dimensional (3D) image, the method comprising:

determining, by a processor, first information indicating which orientations are dominant in a right image and a left image among the stereo images;

determining, by the processor, second information indicating for each pixel location in the right image received from a first camera and the left image received from a second camera whether the corresponding pixel location lies on a pure horizontal edge;

detecting, by the processor, points in the left image and the right image based on the first information and the second information;

performing, by the processor, a matching on the left image and the right image using the detected points to estimate a disparity map; and obtaining the 3D image from the disparity map, wherein the first information indicates a selected one of the orientations is dominant for a selected one of the right and left images when the selected image includes more than a certain number of the pixel locations of the selected one orientation.

2. The method of claim 1, wherein the orientations include a horizontal orientation, a vertical orientation, a slash orientation, and a back-slash orientation.

3. The method of claim 2, wherein determining the first information and the second information for a selected image among the right image and the left image comprises:
dividing, by the processor, the selected image into a plurality of horizontal left and right arms disposed adjacent one another;
dividing, by the processor, the selected image into a plurality of vertical upper and lower arms disposed adjacent one another;
dividing, by the processor, the selected image into a plurality of slash left and right arms disposed adjacent one another; and
dividing, by the processor, the selected image into a plurality of back-slash left and right arms disposed adjacent one another.

4. The method of claim 3, wherein determining the first information and the second information for the selected image comprises:
computing, by the processor, a length for each of the arms based on intensities of pixels of the arms;
computing, by the processor, measures for each of the orientations based on the computed lengths; and
determining, the first and second information from the measures.

5. The method of claim 4, wherein the computing of the length for a selected arm among the arms comprises:
setting, by the processor, the length of the selected arm to an initial value;
computing, by the processor, and absolute difference of a pixel of the selected arm at the length and an origin pixel of the selected arm; and
incrementing, by the processor, the length of the selected arm when the difference is less than or equal to a threshold.

6. The method of claim 5, further comprising repeating the computing until the absolute difference is greater than the threshold.

7. The method of claim 4, wherein computing the measures for a selected orientation among the orientations comprises:
computing, by the processor, a first measure by summing the number of arms of the selected orientation having a length of at most 2;
computing, by the processor, a second measure by summing the number of arms of at most 1.

8. The method of claim 7, wherein determining the first information comprises setting the first information to indicate the selected orientation is dominant when a condition is satisfied requiring the second measure to be >= a first threshold and the first measure to be <= a second threshold.

9. The method of claim 3, wherein determining the second information comprises setting the second information to indicate the selected image has the pure horizontal edge when the first information indicates only the vertical orientation is dominant.

10. The method of claim 1, wherein the right image and the left image are rectified images.

11. A mobile device for matching stereo images comprising a right image and a left image to obtain a three dimensional (3D) image, the mobile device comprising:
a processor configured to determine first information indicating which orientations are dominant in a right image and a left image among the stereo images, second information indicating for each pixel location in the right image and the left image whether the corresponding pixel location lies on a pure horizontal edge, detect points in the left image and the right image based on the first information and the second information, perform a matching on the left image and the right image using the detected points to estimate a disparity map, and obtain the 3D image from the disparity map,
wherein the first information indicates a selected one of the orientations is dominant for a selected one of the right and left images when the selected image includes more than a certain number of the pixel locations of the selected one orientation.

12. The mobile device of claim 11, further comprising a memory storing the first information and the second information.

13. The mobile device of claim 11, wherein the orientations include a horizontal orientation, a vertical orientation, a slash orientation, and a back-slash orientation.

14. The mobile device of claim 13, wherein the processor determines the first information and the second information for a selected image among the right image and the left image by dividing the selected image into a plurality of horizontal left and right arms disposed adjacent one another, dividing the selected image into a plurality of vertical upper and lower arms disposed adjacent one another, dividing the selected image into a plurality of slash left and right arms disposed adjacent one another, and dividing the selected image into a plurality of back-slash left and right arms disposed adjacent one another.

15. The mobile device of claim 14, wherein the processor determines the first information and the second information for the selected image by computing a length for each of the arms based on intensities of pixels of the arms, computing measures for each of the orientations based on the computed lengths, and determining the first and second information from the measures.

16. The mobile device of claim 11, wherein the right image and the left image are rectified images.

17. The mobile device of claim 11, further comprising:
a first camera configured to capture the right image; and
a second camera configured to capture the left image.

18. A method of matching stereo images to obtain a three dimensional (3D) image, the method comprising:
determining, by a processor, information indicating which of at least one of horizontal, vertical, and diagonal orientations are dominant in a right image and a left image among the stereo images;
detecting, by the processor, points in the left image and the right image based on the information;
performing, by the processor, a matching on the left image and the right image using the detected points to estimate a disparity map; and
obtaining the 3D image from the disparity map,
wherein the information indicates a selected one of the orientations is dominant for a selected one of the right and left images when the selected image includes more than a certain number of pixel locations of the selected one orientation.

19. The method of claim 18, wherein the determining of the information for a selected image among the right image and the left image comprises:
dividing, by the processor, the selected image into a plurality of horizontal left and right arms disposed adjacent one another;
dividing, by the processor, the selected image into a plurality of vertical upper and lower arms disposed adjacent one another;

dividing, by the processor, the selected image into a plurality of slash left and right arms disposed adjacent one another; and dividing, by the processor, the selected image into a plurality of back-slash left and right arms disposed adjacent one another.

20. The method of claim 19, wherein the determining of the information for the selected image comprises:

computing, by the processor, a length for each of the arms based on intensities of pixels of the arms;

computing, by the processor, measures for each of the orientations based on the computed lengths; and determining, the information from the measures.

\* \* \* \* \*